United States Patent
Hirao et al.

(10) Patent No.: US 8,721,380 B2
(45) Date of Patent: May 13, 2014

(54) METHOD FOR MANUFACTURING DISPLAY PANEL

(75) Inventors: Yuya Hirao, Koka (JP); Masakazu Okada, Otsu (JP)

(73) Assignee: Konica Minolta Holdings, Inc., Tokyo (JP)

( * ) Notice: Subject to any disclaimer, the term of this patent is extended or adjusted under 35 U.S.C. 154(b) by 169 days.

(21) Appl. No.: 13/389,757

(22) PCT Filed: Jun. 8, 2010

(86) PCT No.: PCT/JP2010/059662
§ 371 (c)(1),
(2), (4) Date: Feb. 9, 2012

(87) PCT Pub. No.: WO2011/018916
PCT Pub. Date: Feb. 17, 2011

(65) Prior Publication Data
US 2012/0142246 A1 Jun. 7, 2012

(30) Foreign Application Priority Data
Aug. 12, 2009 (JP) ................................ 2009-187021

(51) Int. Cl.
*G02F 1/15* (2006.01)
*G02F 1/17* (2006.01)

(52) U.S. Cl.
USPC ............................... 445/25; 445/23; 359/253

(58) Field of Classification Search
USPC .............. 445/23–25; 359/245, 353, 265, 270, 359/296
See application file for complete search history.

(56) References Cited

U.S. PATENT DOCUMENTS

| | | | |
|---|---|---|---|
| 5,854,664 A | 12/1998 | Inoue et al. | |
| 2008/0166590 A1* | 7/2008 | Kokeguchi | 428/690 |
| 2008/0268738 A1* | 10/2008 | Kanai et al. | 445/24 |

FOREIGN PATENT DOCUMENTS

| | | |
|---|---|---|
| JP | 61-213827 | 9/1986 |
| JP | 2001-343657 | 12/2001 |
| JP | 2004-226689 | 8/2004 |
| JP | 2008-145755 | 6/2008 |
| JP | 2010-243626 | 10/2010 |

* cited by examiner

*Primary Examiner* — Karabi Guharay
*Assistant Examiner* — Nathaniel Lee
(74) *Attorney, Agent, or Firm* — Cozen O'Connor (57) ABSTRACT

Disclosed is a method for manufacturing a display panel, which employs a vacuum bonding method. A display material is dispensed such that the height distance from the upper surface of a lower substrate to the top of the display material is larger than the height distance from the surface of either upper or lower substrate on which the seal pattern is formed to the apex of the seal pattern. The upper substrate is placed at a position where the upper substrate and the top of the display material in the height direction are in touch with each other and the seal pattern on one substrate is not in touch with the other substrate, then, air is released. Thus, volatilization of the display material is reduced easily at small cost to prevent drying of the surface of the display material, and the display qualities can be prevented from being degraded.

14 Claims, 6 Drawing Sheets

METHOD FOR MANUFACTURING DISPLAY PANEL

RELATED APPLICATIONS

This application is a U.S. National Phase Application under 35 USC 371 of International Application PCT/JP2010/059662 filed Jun. 8, 2010.

This application claims the priority of Japanese application No. 2009-187021 filed Aug. 12, 2009, the entire content of which is hereby incorporated by reference.

TECHNICAL FIELD

The present invention relates to a method for manufacturing a display panel, in particular to a method for manufacturing a display panel in which display material does not easily adversely affected.

BACKGROUND ART

In recent years, display devices that are excellent in visibility and have low power consumption are required. Display devices that emit light or modulate light from a self light-emitting body such as CRTs (Cathode Ray Tubes), PDPs (Plasma Display Panels), and LCDs (Liquid Crystal Displays), which are commonly used in these days, are bright and easy to see but have a problem of large power consumption.

From the view point of low power consumption, it is preferable that a display device has a memory property, with which the screen which is once displayed is maintained without power, and it is further preferable that the drive voltage is low.

In recent years, as the display device having such properties, electrodeposition display devices (hereinafter, referred to as "ED devices") that contain electrolysis solution containing metal or compound having metal in its chemical structure, or electrochemical display devices (hereinafter, referred to as "ECDs") employing the reversible change of light absorption state due to oxidation-reduction reaction on the electrode are being actively developed.

The ED device and the ECD utilize, in a display principle, the change in light absorption in reacting substance itself due to oxidation-reduction reaction on the electrode, and these elements are more advantageous in terms of cost reduction and process reduction than the LCD since they do not need such members as polarizers or backlights.

As a method for manufacturing an ED device and an ECD, the vacuum injection method, which was used for manufacturing conventional LCDs, was used at first. However, recently, the vacuum bonding method used for manufacturing large LCDs is broadly used to deal with larger display panels and to improve display property such as display non-uniformity after long-term use, because it is difficult to inject electrolysis solution by the conventional vacuum injection method in order to use gel or highly-viscous electrolysis solution.

Figure 7A:
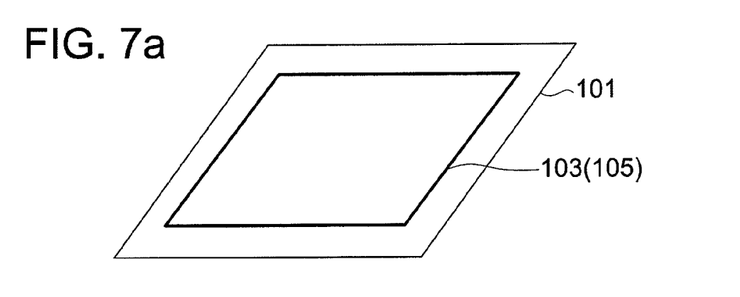
FIGS. 7a-7d are diagrams showing a rough flow of a conventional vacuum bonding method.
Figure 7B:
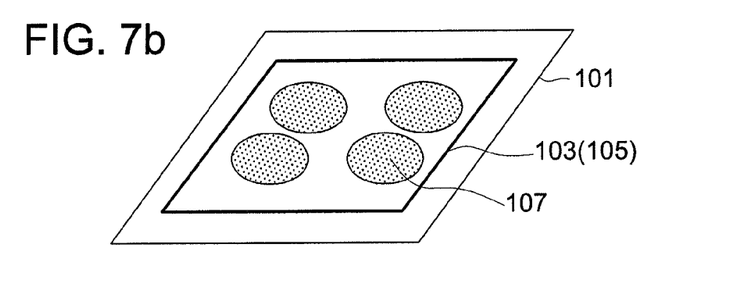

A schematic flow of the vacuum bonding method used in manufacturing LCDs are shown in FIGS. 7a and 7b, and a seal pattern 105 is formed on a lower substrate 101 with UV (ultra violet) curable seal material 103, for example (see FIGS. 7a-7d), and a moderate amount of display material 107 made of liquid crystal is dispensed with a dispenser inside the seal pattern 105 (see FIG. 7b). On the surface of the lower substrate 101 on which the seal pattern 105 is to be formed, there is a lower electrode (not shown in the drawing) previously formed.

Figure 7C:
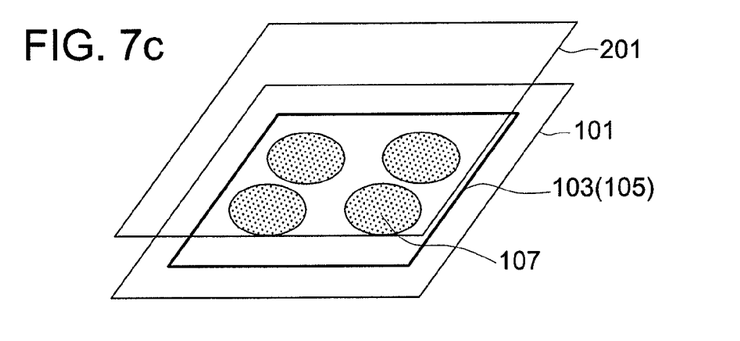
Figure 7D:
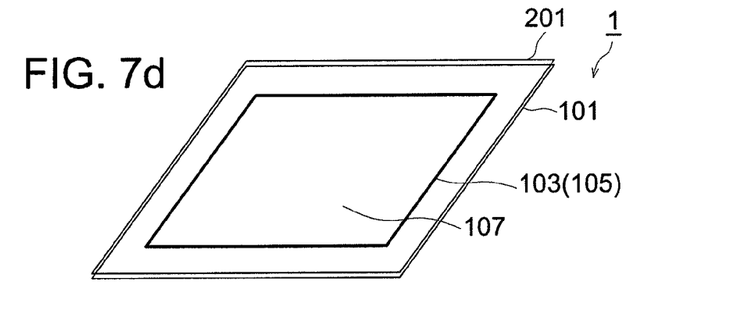

After that, the lower substrate 101 is decompressed as a whole in a vacuum chamber, and an upper substrate 201 is stacked on the lower substrate 101 in the decompressed environment (see FIG. 7c). On the surface, of the upper substrate 201, which is facing the lower substrate 101, there is an upper electrode (not sown in the drawing) previously formed. By stacking, the display material 107 dispensed with the dispenser is spread inside the seal pattern 105. Next, by opening the vacuum chamber to the atmosphere, the upper substrate 201 is uniformly pressed as a whole by the atmospheric pressure. After that, the seal material 103 is cured by the exposure of UV light to adhere the upper substrate 201 and the lower substrate 101, thereby an LCD panel 1 is completed (FIG. 7d).

However, the electrolysis solution used as the display material for the ED device and the ECD contains solvent, and the solvent is more likely to volatilize than the liquid crystal material. In the vacuum bonding method for the above-described manufacture of the LCD, there is a step for decompressing the lower substrate on which the liquid crystal material has been dispensed, in the vacuum chamber before the stacking, and in the case of the ED device and the ECD, the solvent component of the electrolysis solution volatilizes under the reduced-pressure.

The electrolysis solution to be dispensed is adjusted in its composition to display appropriately, and volatilization of a part of the composition causes change in the composition rate, thereby degrading display quality. Further, due to volatilization of a part of the composition, the surface of the electrolysis solution is dried, and traces of dispense and unevenness of injection of the electrolysis solution appear when the display panel is completed, thereby resulting in deterioration in the display quality.

To address this issue, as a manufacturing method of a display panel using display material with high volatility, Patent Document 1, for example, discloses a method in which display material of more amount than needed for filling up one panel is dispensed, and bonding is performed while ejecting gas bubbles from the edge of the upper substrate. In addition, Patent Document 2 discloses a manufacturing method of a display panel in which stacking is performed while controlling the degree of vacuum of the depression according to a formula.

RELATED ART DOCUMENT

Patent Document

Patent Document 1: Japanese Laid-open Patent Application Publication H08-152643
Patent Document 2: Japanese Laid-open Patent Application Publication 2001-343657

SUMMARY OF THE INVENTION

Object of the Invention

However, in the method of Patent Document 1, the display material spilled out during the stacking contaminates the periphery of the substrate, and the contamination may cause problems at the time of assembling a drive circuit in the later step. In addition, according to the method of Patent Document 2, the manufacturing process is complicated, and a complex device is needed for the control of the degree of vacuum, thereby resulting in a cost increase of the display panel.

The present invention has been made in view of the above described situation, and an object is to provide a manufacturing method of a display panel in which volatilization of the display material is reduced in a simple way at small cost to prevent drying of the surface of the display material, thereby preventing the display quality from being degraded in the manufacturing of a display panel by the vacuum bonding method.

Means for Solving the Object

An object of the present invention is achieved by the following configuration.

Item 1. A method for manufacturing a display panel having: an upper substrate; a lower substrate; display material filled between the upper substrate and the lower substrate; and a seal pattern provided between the upper substrate and the lower substrate so as to connect the upper substrate and the lower substrate such that the seal pattern surrounds a cell gap which is an area in which the display material is filled, the method performing the steps of:

a seal pattern forming step for forming the seal pattern with seal material on the lower substrate or under the upper substrate;

a display material dispensing step for dispensing, before or after the seal pattern forming step, the seal material at a position which is on the lower substrate and inside the seal pattern such that a distance from an upper surface of the lower substrate to a top, in height direction, of the display material is larger than a distance from a surface of the upper substrate or the lower substrate on which the seal pattern is formed to the top, in height direction, of the seal pattern;

an alignment step for setting the upper substrate, with respect to the lower substrate, at a position at which the upper substrate and the top, in height direction, of the display material are in touch with each other and the seal pattern formed on the upper substrate or the lower substrate is not in touch with the opposed substrate;

a decompressing step for discharging gas in an internal area of the seal pattern to make the internal area be in a reduced-pressure state while keeping a state that the upper substrate has been set in the alignment step;

a stacking step for stacking the lower substrate and the upper substrate together while keeping the internal area of the seal pattern to be in the reduced-pressure state; and a curing step for curing the seal pattern.

Item 2. The method of item 1 for manufacturing a display panel, wherein the display material includes metal or compound containing metal in a chemical structure thereof.

Item 3. The method of item 1 for manufacturing a display panel, wherein the display material includes electrochromic dye.

Item 4. The method of any one of items 1 to 3 for manufacturing a display panel, wherein the display material includes volatile solvent.

Item 5. The method of any one of items 1 to 4 for manufacturing a display panel, wherein the display material includes binder made of polymer material.

Item 6. The method of any one of items 1 to 5 for manufacturing a display panel, comprising, before the alignment step:

a second seal pattern forming step for forming a second seal pattern outside the seal pattern, wherein in the decompressing step, an area between the seal pattern and the second seal pattern is made to be in a reduced-pressure state by discharging gas in the area between the seal pattern and the second seal pattern.

Advantage of the Invention

As described above, the present invention provides, in the production of a display panel by the vacuum bonding method, a method for manufacturing a display panel in which volatilization of the display material is reduced to prevent drying of the surface of the display material, thereby preventing the display quality from being degraded in a simple way at small cost, by performing the steps of: dispensing the display material such that the distance from the upper surface of the lower substrate to the top, in height direction, of the display material is larger than the distance from the surface of the upper substrate or the lower substrate, on which the seal pattern is formed, to the apex in height direction of the seal pattern; and decompressing after the upper substrate is placed at a position at which the upper substrate and the apex in height direction of the display material are in touch with each other, and the seal pattern formed on the upper substrate or the lower substrate is not in touch with the substrate opposing to it.

MEANS FOR SOLVING THE OBJECT

The present invention is described below based on an embodiment shown in the drawings; however, the present invention is not limited to the embodiment. In the drawings, the same reference numerals are assigned to the same or similar portions, and redundant descriptions are omitted.

Figure 1:
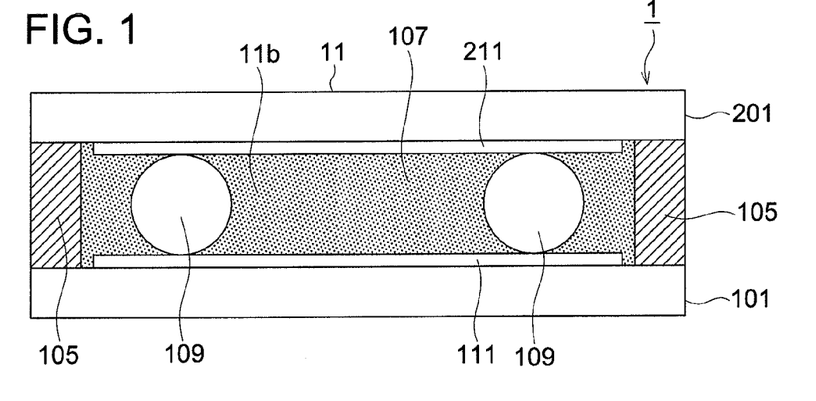
FIG. 1 is a sectional schematic diagram showing an example of a configuration of a display panel manufactured according to the present invention.

First, the structure of the display panel manufactured according to the present invention is described with reference to FIG. 1. FIG. 1 is a sectional schematic diagram showing an example of the configuration of the display panel manufactured according to the present invention.

With reference to FIG. 1, a display panel 1 has a configuration in which display material 107 is filled in an area 11b (hereinafter referred to as a "cell gap") as a display area 11 of the display panel 1 surrounded by a lower substrate 101, an upper substrate 201, and a seal pattern 105.

On the cell gap 11b side of the lower substrate 101 is provided with a lower electrode 111, and on the cell gap 11b side of the upper substrate 201 is provided with an upper electrode 211. The gap between the lower electrode 111 and the upper electrode 211 is maintained by the diameter of spherical spacers 109 dispersed in the cell gap 11b. The display panel 1 is observed from the side of the upper substrate 201. Therefore, the upper electrode 211 must be a transparent electrode.

In the case that the display panel 1 is an ED device, a transparent electrode such as ITO (Indium Tin Oxide) electrode is used for the upper electrode 211, and a metal electrode such as a silver electrode is used for the opposing lower electrode 111. Between the two electrodes, there is filled electrolysis solution containing silver or compound having silver in its chemical structure as a display material 107, and by applying a bipolar voltage between the two electrodes, oxidation-reduction reaction of silver is performed on the electrodes, the reduced black silver image and the oxidized transparent silver are reversibly switched on the upper electrode 211 as a transparent electrode.

Further, by dispersing white oxidized metal fine particles such as $TiO_2$ or ZnO, together with polymer material as binder, in the display material 107 made of electrolysis solution, high-quality white can be displayed when the surface of the upper side of the upper electrode 211 is transparent.

In the case that the display panel 1 is an ECD, an electrode such as an ITO electrode is used as the upper electrode 211, and an electrode having a tin oxide layer in which antimony is doped in an ITO electrode is used as the opposing lower electrode 111. Between the two electrodes, there is filled electrolysis solution containing electrochromic dye as the display material 107, and by applying a bipolar voltage between the two electrodes, the oxidation-reduction reaction of the electrochromic dye is performed on the upper electrode 211, thereby reversibly switching the colorized state of the electrochromic.

Also in this case, by dispersing white oxidized metal fine particles such as $TiO_2$ and ZnO, together with polymer material as binder, in the display material 107 made of electrolysis solution, high-quality white can be displayed when the electrochromic dye is transparent.

Here, a description is made on the "electrolysis solution" in the explanation of the present invention. In general, "electrolyte" is a substance or a characteristic which exhibits ionic conductivity when it is dissolved in solvent such as water, and an "electrolysis solution" is a solution of the electrolyte (narrow-defined as an "electrolysis solution"). However, in the description of the present invention, the "electrolysis solution" refers to as a mixture (broadly defined as an "electrolysis solution") containing metal and compound (no restriction on whether electrolyte or non-electrolyte) in addition to the narrow-defined "electrolysis solution."

Getting back to the description, the silver or the compound containing silver in its chemical structure used for the display material 107 made of electrolysis solution in the above mentioned ED device are a collective term of compound such as silver oxide, silver sulfide, metallic silver, silver colloid particles, silver halide, silver complex compound, and silver ion, and there is no restriction to the state of phase such as a solid state, a solubilization state with respect to liquid, or a gaseous state, or on the charged state such as neutral, anionic, or cationic. In the description of the embodiment, silver or compounds containing silver in its chemical structure are exemplified; however, metals other than silver can be used.

The display material 107 made of electrolysis solution preferably has a silver ion concentration of 0.2 mol/kg or more and 2.0 mol/kg or less. If the silver ion concentration is lower than the lower limit, the silver solution is so thin that the drive speed of display is accordingly low. If the silver ion concentration is higher than the upper limit, the solubilization is so low that silver is likely to be deposited during low temperature storage.

In the above-described ECD, the electrochromic dye used in the display material 107 made of electrolysis solution is a compound that changes its light absorption state by gaining and losing of electrons, and may be organic compounds or metallic complexes. As organic compound, a pyridine compound, conductive polymer, and styryl compound can be used, and various viologen compounds disclosed in Japanese Laid-Open Patent Application Publication No. 2002-328401, the dye disclosed in Japanese Translation of PCT International Application Publication No. 2004-537743, or other known dye can be used, for example. If leuko dye is used, color developing agent or color removal agents may also be used if necessary.

These materials may be directly applied on the electrode, or, for the purpose of effectively giving and receiving electrons, a nano-structure of oxide semiconductor exemplified by $TiO_2$ may be formed on the electrode, and electrochromic materials may be applied on or impregnated in the electrode by an inkjet method or the like.

The electrolysis solution as the above-described display material 107 for the ED device or the ECD is made up of the properly-selected components such as organic solvent, polymer binder, spherical spacers, white metal oxide fine particles, ionic liquid, oxidation-reduction activation substance, support electrolyte, and complexation agent. The main components constituting the above-described electrolysis solution are described below.

First, materials that can be used as organic solvent that does not volatilize after preparing electrolysis solution and stays in the electrolysis solution and has a boiling point within the range of 120 to 300° C., and examples include: propylene carbonate, ethylene carbonate, ethyl methyl carbonate, diethyl carbonate, dimethyl carbonate, butylene carbonate, γ-butyrolactone, tetramethylurea, tetramethylurea, dimethylsulfoxide, 1,3-diethyl-2-imidazolidinone, 2-(N-methyl)-2-pyrrolidinone, hexamethyl, N-methyl propionamide, dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, acetic anhydride, ethyl acetate, ethyl propionate, dimethoxyethane, diethoxyfuran, tetrahydrofuran, ethylene glycol, diethylene glycol, triethylene glycol, and monobutyl ether.

Next, polymer binder, which is one of the features of the display material 107 of the present invention and is used to increase viscosity, has no restriction, and can be selected, from the view point of the display device properties and the viscosity of the electrolysis solution, from the various polymer compounds such as butyral resin, polyvinyl alcohol, polyethylene glycol, polyvinylidene fluoride.

In addition, as the spherical spacers 109, fine spherical glass, acrylic, or silica particles, which are used for liquid crystal displays, can be used, for example. The average particle size is preferably in the range of 10 μm or more and 50 μm or less to ensure the stability of dispersion in the electrolysis solution and whiteness due to diffusion effect of the metallic fine particles dispersed in the electrolysis solution.

Further, as white metal oxide fine particles used to achieve high-quality white display by diffusing light, inorganic metal oxide is preferable, and examples include: titanium dioxide (anatase-type or ruffle type), barium sulfate, calcium carbonate, aluminum oxide, zinc oxide, magnesium oxide, zinc hydroxide, magnesium hydroxide, magnesium phosphate, magnesium hydrogenphosphate, alkaline-earth metal salt, talc, kaolin, zeolite, acid earth, and glass.

Figure 2:
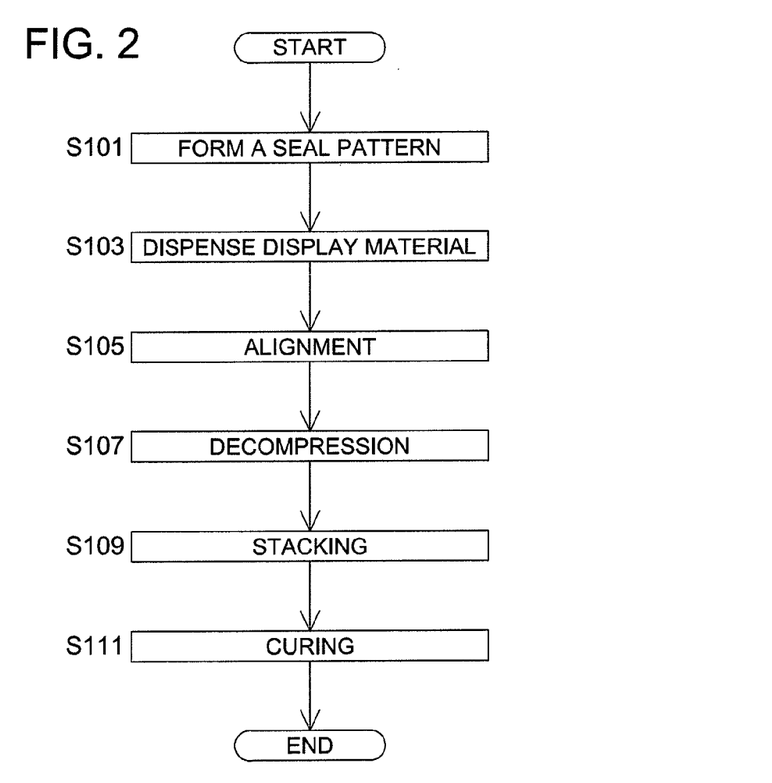
FIG. 2 is a flow chart of a manufacturing method of the display panel of a first embodiment according the present invention.

Next, the method for manufacturing the display panel of the first embodiment according to the present invention is described with reference to FIG. 2 and FIG. 3a-3e. FIG. 2 shows a flow chart showing the first embodiment of the method for manufacturing a display panel according to the present invention. FIGS. 3a-3e are sectional schematic diagrams of the display panel showing the steps of FIG. 2.

First, the flow chart of FIG. 2 is described with reference to FIGS. 3a-3e.

Step S101 (Seal Pattern Formation Step)

Figure 3A:
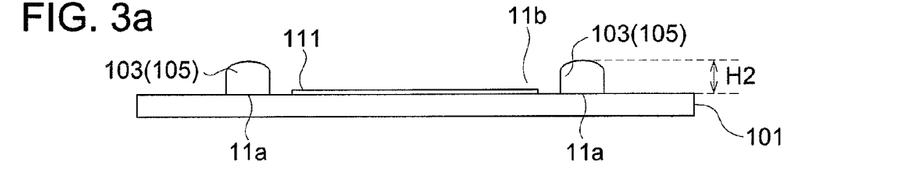
FIGS. 3a-3e are sectional schematic diagrams of the display panel showing each step in FIG. 2.

This is a step for forming a seal pattern 105 by using seal material 103. As shown in FIG. 3a, the seal material 103 is applied by using a dispenser, for example, to a predetermined seal position 11a which is surrounding a cell gap 11b on a lower substrate 101, so as to form a seal pattern 105 in which the distance of height direction from the surface of the lower substrate 101 is H2

The material for the lower substrate 101 and an upper substrate 201, to be described later, includes a glass substrate, a rigid plastic substrate, a non-rigid plastic substrate, or the like, and there is no restriction. Further, the lower substrate 101 and the upper substrate 201 may be of the same material or different material. On the side of the cell gap 11b of the lower substrate 101, there is previously formed a lower electrode 111.

The seal pattern 105 is a bulkhead of the display area 11 of the display panel 1, and the space between (inside of) the right and left seal patterns 105 of FIG. 3a is the cell gap 11b. Descriptions are made assuming here that the seal material 103 is UV curable seal material, but the material is not restricted to that.

Step S103 (Display Material Dispense Step)

Figure 3B:
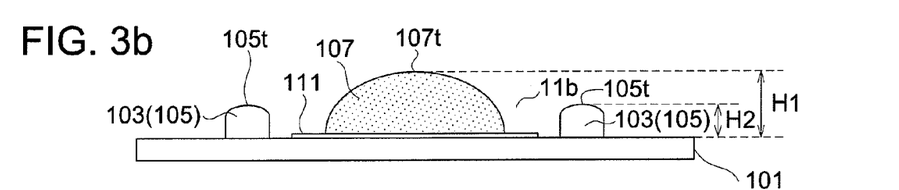

This step is for dispensing the display material 107 in the cell gap 11b. As shown in FIG. 3b, in the cell gap 11b between the right and left seal patterns 105, the display material 107 is dispensed by using a dispenser, for example, such that the position 107t, the top in height direction of the display material 107, is higher than the apex (upper end) in height direction of the seal pattern 105 (in other words, such that a distance H1 from the upper surface of the lower substrate to the top in height direction of the display material 107 is larger than a distance H2 from the upper surface of the lower substrate 101 to the apex (upper end) in height direction of the seal pattern 105).

Figure 6A:
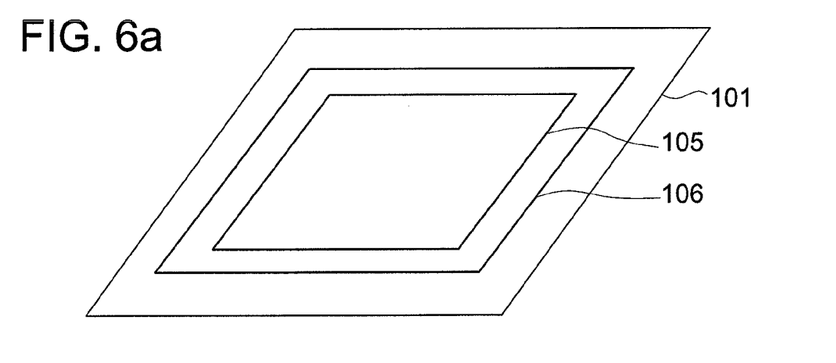
FIGS. 6a-6c are schematic diagrams showing a rough flow of the second embodiment.
Figure 6B:
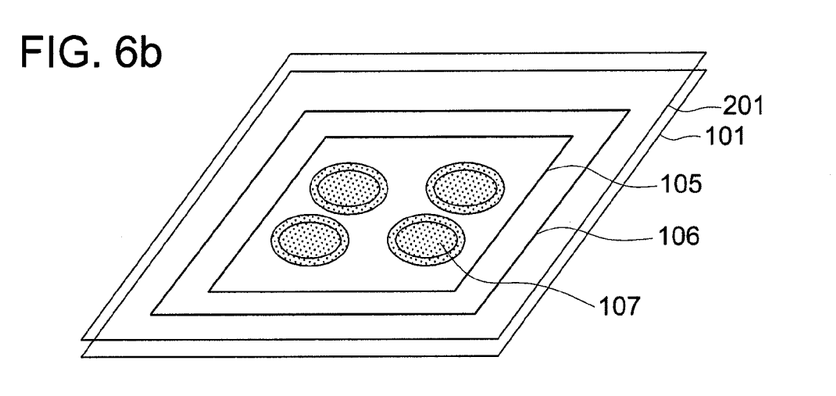

The dispense pattern of the display material 107 may be a line, a pattern, or island patterns arranged as shown in FIG. 6b, to be shown latter, as long as an appropriate amount is dispensed to fully fill the cell gap 11b when the upper substrate 201 and the lower substrate 101 are laminated together.

The display material 107 is electrolysis solution containing solvent to be used as display material for ECDs and ED devices, but the material in the present invention is not restricted to these materials, and the present invention can be applied to all liquid materials, including liquid crystal material, having a display function and having such a viscosity that the height can be adjusted in the above-described display material dispense step.

It should be noted that the spherical spacers 109, which are shown in FIG. 1 but not shown as the drawing, are preferably sprayed in this step. The spherical spacers 109 may be sprayed in the cell gap 11b by an inkjet method, for example, before the display material 107 is dispensed, or may be sprayed being mixed with the display material 107 when the display material 107 is dispensed, and many methods can be considered.

Step S105 (Alignment Step)

This is a step for aligning the upper substrate 201 and the lower substrate 101. The lower substrate 101 is disposed in a vacuum chamber 301, and the upper substrate 201 is disposed over the lower substrate 101 to perform the alignment of them under the state that the display material 107 has been dispensed on the lower substrate 101 such that the distance H1 from the upper surface of the lower substrate 101 to the top in height direction of the display material 107 is larger than the distance H2 from the upper surface of the lower substrate 101 to the apex (upper end) in height direction of the seal pattern 105.

The alignment is performed automatically, for example by using a camera and the like and using the alignment pattern as a target which has been previously provided on each of the upper substrate 201 and the lower substrate 101. On a surface 201a of the upper substrate 201 facing the lower substrate 101, there is an upper electrode 211 previously formed.

Figure 3C:
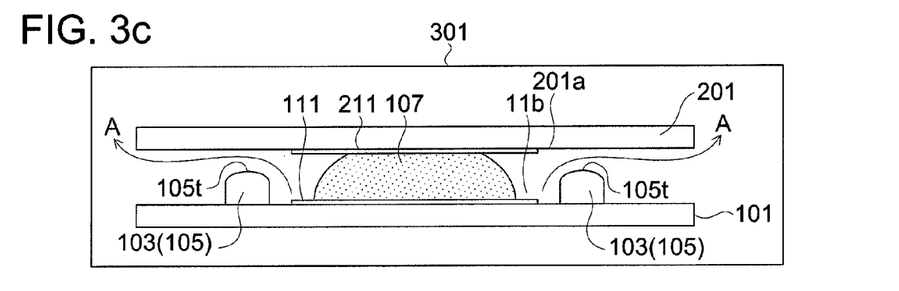

Keeping the state that the alignment has been completed, as shown in FIG. 3c, the upper substrate 201 is moved toward the lower substrate 101 at the position at which the surface 201a, of the upper substrate 201, facing the lower substrate 101 is adequately in touch with the top in height direction of the display material 107 but is not in touch with the seal pattern 105.

Step S107 (Decompression Step)

Under the state that step S105 (alignment step) has been completed, the inside of the vacuum chamber 301 is made to be in a reduced-pressure state to discharge the gas in the cell gap 11b. The gas in the cell gap 11b is discharged through the gap between the upper substrate 201 and the seal pattern 105 as shown by the arrow mark A in FIG. 3c, much of the surface of the display material 107 is in touch with the upper substrate 201, and the solvent contained in the display material 107 thus does not volatile much and the component of the display material 107 does not deteriorate much.

Step S109 (Stacking Step)

Figure 3D:
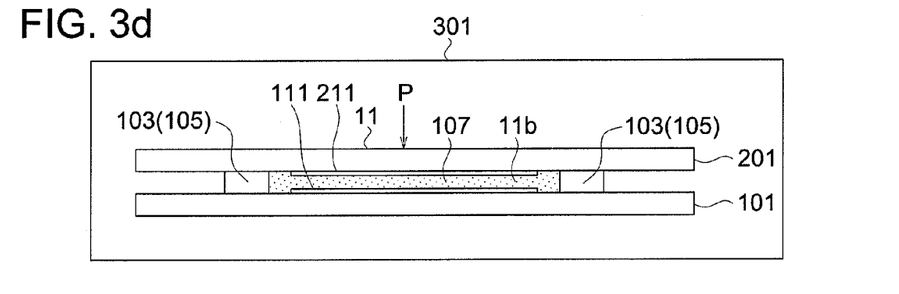

This is a step for stacking the upper substrate 201 and the lower substrate 101 together. As shown in FIG. 3d, a pressure P is applied to the aligned upper substrate 201 in the arrow direction of the drawing to stack the upper substrate 201 and the lower substrate 101 together. By the stacking, the display material 107 is filled in whole the cell gap 11b. By opening the inside of the vacuum chamber 301 to the air with the right and left edges in FIG. 3d, which are apart from the display area 11, being temporarily fixed, the atmospheric pressure is applied to the whole of the upper substrate 201 and the whole surface is evenly pressurized.

Step S111 (Curing Step)

Figure 3E:
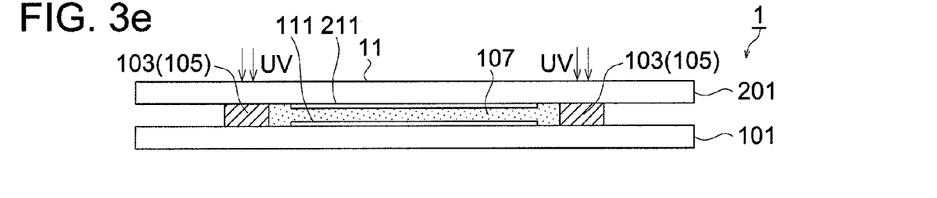

This is a step for adhering the upper substrate 201 and the lower substrate 101, by curing the seal material 103. As shown in FIG. 3e, UV light is applied to the seal pattern 105 made of the seal material 103 so as to completely cure the material to complete the display panel 1. In the case that the seal material 103 is thermo curable seal material, for example, the material can be completely cured by irradiation of infrared light from the upper substrate 201 side, by burning using an oven, or the like.

As described above, according to the first embodiment of the manufacturing method of a display panel regarding the present invention, volatilization of the display material is reduced to prevent drying of the surface of the display material in a simple way at small cost, thereby providing a manufacturing method of a display panel in which the display quality is prevented from being degraded, by performing the steps of dispensing display material such that the position 107t in height direction of the display material is higher than the apex (upper end) in height direction of the seal pattern (in other words, such that a distance H1 from the upper surface of the lower substrate to the top in height direction of the display material 107 is larger than a distance H2 from the upper surface of the lower substrate 101 to the apex (upper end) in height direction of the seal pattern 105); and reducing the pressure after the upper substrate is moved to the position at which the upper substrate and the top in height direction of the display material are in touch with each other, but the upper substrate and the seal pattern are not in touch with each other.

Figure 4A:
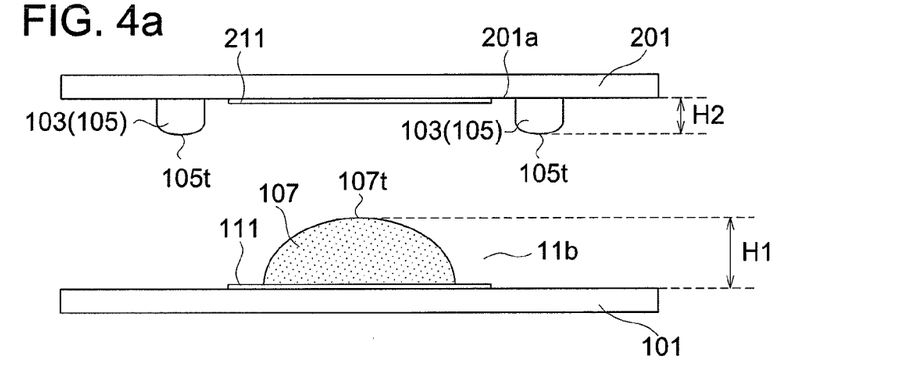
FIGS. 4a and 4b are sectional schematic diagrams of the display panel showing an example in which a seal pattern is formed on the lower side of an upper substrate.
Figure 4B:
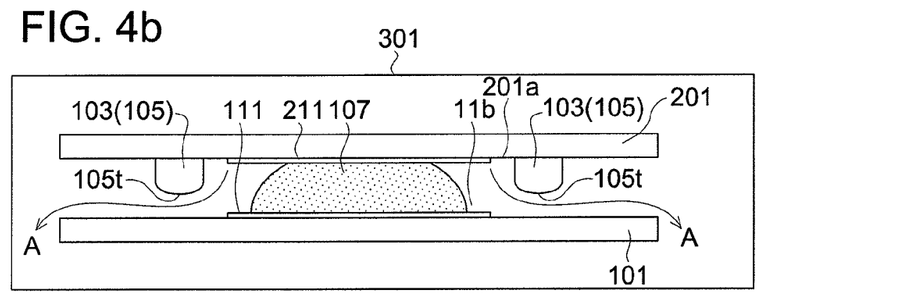

In the present invention, the descriptions were made for an example that the seal pattern 105 is formed on the lower substrate 101, but the seal pattern 105 can be formed on the lower surface of the upper substrate 201. FIGS. 4a and 4b show this configuration. FIGS. 4a and 4b are sectional schematic diagrams of the display panel showing an example of the seal pattern made on the lower surface of the upper substrate. With this configuration, a method of manufacturing a display panel having a similar advantage is provided by performing the steps of dispensing the display material 107 such that the distance H1 from the supper surface of the lower substrate 101 to the top in height direction of the display material 107 is larger than the distance H2 from the lower surface of the upper substrate 201 to the apex (lower end) in height direction of the seal pattern 105, as shown in FIG. 4a; and reducing the pressure after the upper substrate is moved to a position at which the upper substrate 201 and the top in height direction of the display material 107 are in touch with each other, but the lower substrate 101 and the seal pattern 105 are not in touch with each other, as shown in FIG. 4b.

In addition, the embodiment is described based on an example that the step for dispensing the display material 107 is performed after the formation of the seal pattern 105; however, the seal pattern 105 can be formed after the dispense of the display material 107.

Figure 5:
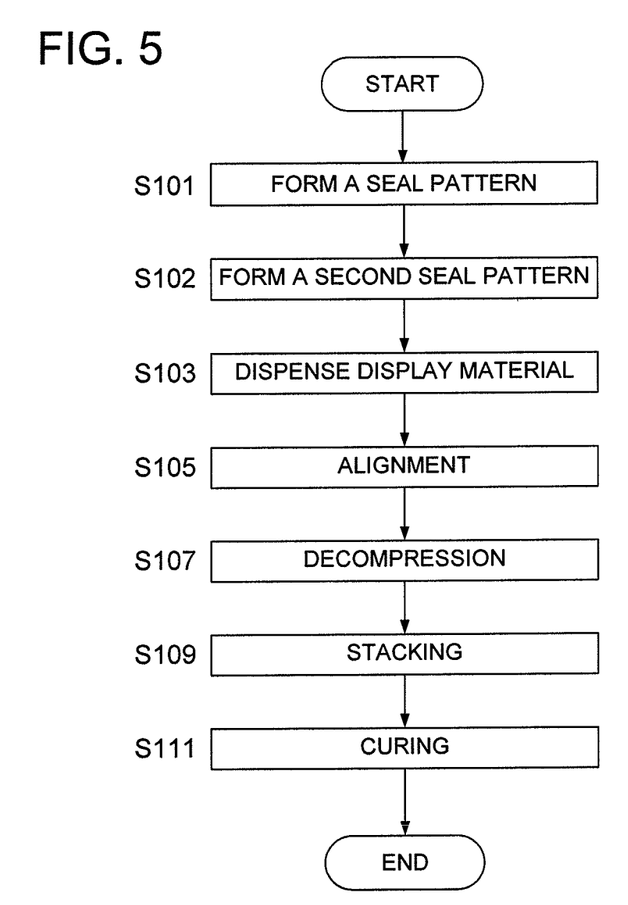
FIG. 5 is a flow chart showing a second embodiment of a manufacturing method of the display panel according to the present invention.
Figure 6C:
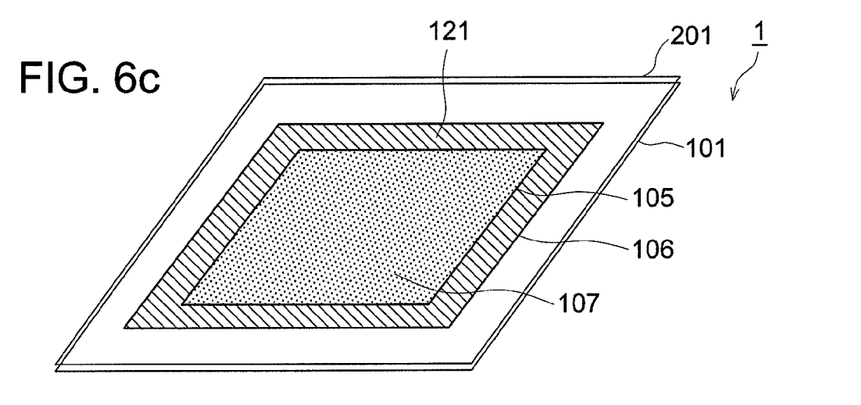

Next, a second embodiment of a method of manufacturing a display panel according to the present invention is described with reference to FIG. 5 and FIGS. 6a-6c. FIG. 5 is a flow chart showing the second embodiment of the method of manufacturing a display panel according to the present invention, and FIGS. 6a-6c are perspective schematic diagrams showing a rough flow of the second embodiment.

The second embodiment is different from the first embodiment in that in the flow chart of FIG. 5, step S102 (second seal pattern formation step) for forming a second seal pattern 106 at a predetermined distance outside the seal pattern 105 is provided between step S101 (seal pattern formation step) and step S103 (display material dispense step), as shown in FIG. 6a.

The seal material for forming the second seal pattern 106 may be the same as the seal material 103 for forming the seal pattern 105 or may be different. For example, material which hardly deteriorates the display material 107 when it is in direct contact with the display material 107 may be used as the seal material 103 for forming the seal pattern 105; and material which has high adhesiveness with the upper substrate 201 and the lower substrate 101 as the seal material for forming the second seal pattern 106. Other components are the same as in the first embodiment, and descriptions on them are omitted.

Step S102 (the second seal pattern formation step) does not need to be performed between step S101 (seal pattern formation step) shown in FIG. 5 and step S103 (step for dispensing display material), and may be performed with step S101 (seal pattern formation step) at the same time, for example, or may be performed between step S103 (step for dispensing display material) and step S105 (alignment step). That is to say, it only has to be performed before the alignment step.

Owing to the second seal pattern 106 provided, a reduced-pressure area 121 which is surrounded by the seal pattern 105, the second seal pattern 106, the upper substrate 201, and the lower substrate 101 is kept in reduced-pressure state in step S109 (stacking step) of FIG. 5 when the upper substrate 201 and the lower substrate 101 are stacked together in the vacuum chamber 301 in the reduced-pressure state as shown in FIG. 6c.

With this arrangement, when the vacuum chamber 301 is opened to the air after the stacking, the reduced-pressure area 121 between the upper substrate 201 and the lower substrate 101 is kept in the reduced-pressure state, and the atmospheric pressure generates a force to press the upper substrate 201 and the lower substrate 101. Thus, fixing such as the temporary fixation after the stacking described in step S109 (stacking step) of FIG. 2 is not necessary.

With this arrangement, according to the second embodiment, the reduced-pressure area 121 kept in the reduced-pressure state can be provided by forming the second seal pattern 106 at a predetermined distance outside the seal pattern 105 and by using the atmospheric pressure, fixing such as the temporary fixation after the stacking can be omitted, whereby the production process can be simplified, in addition to the advantages of the first embodiment.

In this arrangement, the distance between the seal pattern 105 and the second seal pattern 106 depends on the size of the display panel 1 and the material of the display material 107, and should be no shorter than the distance which can maintain enough pressure to fix the upper substrate 201 and the lower substrate 101 together. In addition, both of the seal pattern 105 and the second seal pattern 106 may be formed on the lower substrate 101 or on the upper substrate 201, or one of them may be on the lower substrate 101 and the other of them may be on the upper substrate 20.

As described above, the present invention can provide, in the production of a display panel by a vacuum bonding method, a method of manufacturing a display panel in which volatilization of the display material is reduced to prevent drying of the surface of the display material, thereby preventing the display quality from being degraded in a simple way at small cost, by performing the steps of: dispensing the display material such that the distance from the upper surface of the lower substrate to the top in height direction of the display material is larger than the distance from the surface, of the lower substrate or the upper substrate, having the seal pattern to the apex in height direction of the seal pattern; and decompressing after the upper substrate is placed at a position at which the upper substrate and the apex in height direction of the display material are in touch with each other, and the seal pattern formed on the upper substrate or the lower substrate is not in touch with the substrate opposing to it.

It should be noted that the detailed configuration or the detailed operation of each component constituting the method of manufacturing a display panel according the present invention can be modified if necessary without departing from the scope of the present invention.

EXAMPLES

Table 1 shows dispense amount of the display material 107, and the volatilization amount and the volatilization proportion of the solvent in display material 107 before and after step S107 (decompression step), with respect to the six display panels 1 produced as working examples by the above-described first embodiment of the method of manufacturing a display panel.

In addition, the table shows the dispense amount of the display material 107, and the volatilization amount and the volatilization proportion of the solvent in display material 107 before and after the decompression in the vacuum chamber, with respect to six display panels 1 produced as comparative example by a conventional method, shown in FIGS.

7a-7d, of manufacturing a display panel. In the process, conditions for both of the working examples and the comparative examples are that the distance between the apex in height direction of the seal pattern and the opposing substrate was 70 µm, and the compression period was 1 minute.

From the results of examples in Table 1, it is apparent that the present invention is advantageous because the volatilization amount and the volatilization proportion are different between the working examples and the comparative examples by approximately one digit.

TABLE 1

|   | Working Example | | | Comparative Example | | |
|---|---|---|---|---|---|---|
|   | Dispense Amount (mg) | Volatilization Amount (mg) | Volatilization Proportion (%) | Dispense Amount (mg) | Volatilization Amount (mg) | Volatilization Proportion (%) |
| 1 | 73.6 | 0.7 | 0.9 | 68.2 | 9.8 | 12.6 |
| 2 | 68.5 | 1.1 | 1.6 | 67.8 | 10.4 | 13.3 |
| 3 | 67.7 | 2.3 | 3.3 | 67.7 | 11.3 | 14.3 |
| 4 | 68.6 | 0.2 | 0.3 | 68.7 | 9.0 | 11.6 |
| 5 | 67.6 | 2.2 | 3.2 | 65.8 | 10.0 | 13.2 |
| 6 | 69.5 | 0.5 | 0.7 | 65.4 | 10.6 | 13.9 |

DESCRIPTION OF THE NUMERALS

1: Display panel
11: Display area
11a: Seal position
11b: Cell gap
101: Lower substrate
103: Seal material
105: Seal pattern
105t: Position of the apex in height direction of the seal pattern 105
106: The second seal pattern
107: Display material
107t: Position of the top in height direction of the display material 107
109: Spherical spacer
111: Lower electrode
121: Reduced-pressure area
201: Upper substrate
201a: Surface, of the upper substrate 201, opposing the lower substrate 101
211: Upper electrode
301: Vacuum chamber

The invention claimed is:

1. A method for manufacturing a display panel including a pair of an upper substrate and a lower substrate being opposed to each other, a display material interposed therebetween, and a seal pattern which is made of seal material and formed between the upper substrate and the lower substrate to connect the substrates such that the seal pattern surrounds a display region in which the seal material is not disposed and which is filled with the display material, the method comprising the steps of:
   forming the seal pattern with the seal material on the lower substrate or on the upper substrate, the seal pattern having a thickness from a surface of the substrate on which the seal pattern is formed;
   dispensing the display material on the surface of the lower substrate so as to create a display material puddle such that a height of the display material puddle is larger than the thickness of the seal pattern;
   placing the upper substrate over the lower substrate at a position such that the seal pattern and the display material are located between the upper substrate and the lower substrate, the position at which the upper substrate is in touch with the display material puddle, and the seal pattern is in touch with only one of the substrate;
   reducing pressure in the display region to discharge gas therefrom, while keeping the upper substrate at the position;
   making the upper substrate and the lower substrate at a position at which the seal pattern is in touch with both of the substrates to laminate the substrates while keeping the display region at reduced pressure; and
   curing the seal material of the seal pattern.

2. The method of claim 1, wherein the display material includes metal or compound having metal in a chemical structure thereof.

3. The method of claim 1, wherein the display material includes electrochromic dye.

4. The method of claim 1, wherein the display panel is an electrochromic display panel.

5. The method of claim 1, wherein the display panel is an electrodeposition display panel.

6. The method of claim 1, wherein the display material includes volatile component.

7. The method of claim 1, wherein the display material includes polymer binder.

8. A method for manufacturing a display panel including a pair of an upper substrate and a lower substrate being opposed to each other, a display material interposed therebetween, a first seal pattern which is made of seal material and formed between the upper substrate and the lower substrate to connect the substrates such that the first seal pattern surrounds a display region in which the seal material is not disposed and which is filled with the display material, the method comprising the steps of:
   forming the first seal pattern with the seal material on the lower substrate or on the upper substrate, the seal pattern having a first thickness from a surface of the substrate on which the seal pattern is formed;
   dispensing the display material on the surface of the lower substrate, so as to create a display material puddle having a height such that the height of the display material puddle is larger than the thickness of the first seal pattern;
   forming a second seal pattern with seal material, having a second thickness and surrounding the first seal pattern,
   placing the upper substrate over the lower substrate at a position such that the first seal pattern, the second seal pattern, and the display material are located between the upper substrate and the lower substrate, and the upper substrate is in touch with the display material puddle, and each of the first seal pattern and the second seal pattern is in touch with only one of the substrates;
   reducing pressure in the inner side of the second seal pattern to discharge gas therefrom, while keeping the upper substrate at the position;
   making the upper substrate and the lower substrate in a position that each of the first seal pattern and the second seal pattern is in touch with both of the substrates to laminate the substrates while keeping the inner side of the second seal pattern at reduced atmospheric pressure; and
   curing the seal material of the first seal pattern and the second seal pattern.

9. The method of claim 8, wherein the display material includes metal or compound having metal in a chemical structure.

10. The method of claim 8, wherein the display material includes electrochromic dye.

11. The method of claim 8, wherein the display panel is an electrochromic display panel.

12. The method of claim 8, wherein the display panel is an electrodeposition display panel.

13. The method of claim 8, wherein the display material includes volatile component.

14. The method of claim 8, wherein the display material includes polymer binder.

* * * * *